US009514023B2

(12) United States Patent
Barsness et al.

(10) Patent No.: US 9,514,023 B2
(45) Date of Patent: Dec. 6, 2016

(54) MESSAGE FLOW CONTROL IN A MULTI-NODE COMPUTER SYSTEM

(75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 644 days.

(21) Appl. No.: 12/144,783

(22) Filed: Jun. 24, 2008

(65) Prior Publication Data

US 2009/0319621 A1 Dec. 24, 2009

(51) Int. Cl.
*G06F 15/16* (2006.01)
*G06F 11/34* (2006.01)
*G06F 11/07* (2006.01)

(52) U.S. Cl.
CPC ....... *G06F 11/3495* (2013.01); *G06F 11/0724* (2013.01); *G06F 11/0781* (2013.01); *G06F 11/3433* (2013.01); *G06F 11/3471* (2013.01); *G06F 2201/86* (2013.01); *G06F 2201/88* (2013.01)

(58) Field of Classification Search
USPC .......................................................... 709/249
See application file for complete search history.

(56) References Cited

U.S. PATENT DOCUMENTS

| | | | |
|---|---|---|---|
| 5,241,652 A * | 8/1993 | Barabash et al. | 706/48 |
| 6,182,130 B1 * | 1/2001 | Dolin et al. | 709/221 |
| 7,032,119 B2 * | 4/2006 | Fung | 713/320 |
| 7,295,831 B2 * | 11/2007 | Coleman et al. | 455/410 |
| 7,457,236 B2 * | 11/2008 | Cheng et al. | 370/220 |
| 7,461,130 B1 * | 12/2008 | AbdelAziz et al. | 709/208 |
| 7,707,288 B2 * | 4/2010 | Dawson et al. | 709/226 |
| 2003/0074607 A1 * | 4/2003 | Brundridge et al. | 714/48 |
| 2004/0103218 A1 * | 5/2004 | Blumrich et al. | 709/249 |
| 2004/0139194 A1 * | 7/2004 | Naganathan | 709/224 |
| 2004/0181709 A1 * | 9/2004 | Gibson et al. | 714/25 |
| 2004/0210320 A1 * | 10/2004 | Pandya | 700/1 |
| 2005/0037733 A1 * | 2/2005 | Coleman et al. | 455/411 |
| 2006/0176826 A1 * | 8/2006 | Archer et al. | 370/242 |
| 2006/0195896 A1 * | 8/2006 | Fulp et al. | 726/11 |
| 2008/0243848 A1 * | 10/2008 | Vedula | 707/8 |
| 2009/0049428 A1 * | 2/2009 | Cozmei | 717/128 |
| 2009/0287628 A1 * | 11/2009 | Indeck et al. | 706/47 |
| 2009/0319621 A1 * | 12/2009 | Barsness et al. | 709/206 |

* cited by examiner

*Primary Examiner* — Andrew Goldberg
(74) *Attorney, Agent, or Firm* — Patterson + Sheridan, LLP

(57) ABSTRACT

Embodiments of the invention provide for controlling message flow across a parallel computer system having multiple compute nodes by selectively grouping compute nodes of such a system into node pools and assigning message flow control policies to nodes in the node pools. The message flow control policies specify logging and/or tracing activities to be performed by instances of applications running on nodes assigned to the node pools. As the application is executed, logging and/or tracing messages are generated on the compute nodes according to message flow control policies assigned to the nodes. Optionally, the message flow is analyzed, the message flow control policies are adjusted, and duplicate messages are eliminated.

25 Claims, 6 Drawing Sheets

MESSAGE FLOW CONTROL IN A MULTI-NODE COMPUTER SYSTEM

BACKGROUND OF THE INVENTION

Field of the Invention

Embodiments of the invention relate to multi-node computing systems.

Description of the Related Art

Powerful computers may be designed as highly parallel systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites world-wide were among five out of the ten top most powerful computers in the world.

One requirement for a cluster computer system, such as Blue Gene/L system, is to provide for monitoring consistency and operational capability of the system and its applications. Thus, it is useful to log functioning of compute nodes of the cluster computer system and trace executing applications running on the compute nodes and report any detected errors and/or failures. For example, developers may use tracing information, such as tracing messages, for debugging applications running on the compute nodes, while administrators may use logging information, such as logging events, for diagnostic and auditing of the system. However, for such information to be useful, numerous messages/events related to functioning of the compute nodes and executing of the applications have to be generated, transmitted, and stored. As number of compute nodes in a cluster computer system grows, generating, transmitting, collecting, and/or storing tracing messages/logging events requires more and more resources, and thus, becomes expensive to support. Moreover, as amount of tracing/logging performed by the computer system increases, the probability of such tracing/logging adversely impacting performance and stability of the computer system increases as well. Additionally, as more and more data is gathered, analyzing such data becomes problematic simply because of the mere volume of data.

SUMMARY OF THE INVENTION

One embodiment of the invention provides a method for controlling message flow in parallel computing system having multiple compute nodes. The method may generally include assigning a set of compute nodes of the system to a node pool and assigning a message flow control policy to the nodes in the node pool. The message flow control policy may specify logging and/or tracing activities to be performed by an instance of an application running on one or more compute nodes in the node pool. The method may further include initiating execution of the application running on the compute nodes in the node pool and, while executing the application, generating one or more tracing and/or logging messages on the one or more compute nodes according to the message flow control policy.

Another embodiment of the invention includes a computer readable storage medium containing a program which, when executed by a processor, performs an operation for controlling message flow in parallel computing system having multiple compute nodes. The operation may generally include assigning a set of compute nodes of the system to a node pool and assigning a message flow control policy to the nodes in the node pool. The message flow control policy may specify logging and/or tracing activities to be performed by an instance of an application running on one or more compute nodes in the node pool. The operation may further include initiating execution of the application running on the compute nodes in the node pool and, while executing the application, generating one or more tracing and/or logging messages on the one or more compute nodes according to the message flow control policy.

Still another embodiment of the invention includes a parallel computing system. The system may generally include a plurality of compute nodes, each having at least a processor and a memory. Each of compute nodes is configured to execute a parallel computing application. The system may also include a service node having at least a processor, a memory, and a tracing-logging control program for controlling message flow in the parallel computing system. The tracing-logging control program may generally be configured to assign a set of compute nodes to a node pool. A message flow control policy is assigned to each compute node of the node pool. The message flow control policy may specify at least one logging and/or tracing activity to be performed by an instance of an application running on one or more computes node assigned to the node pool. The tracing-logging control program may be further configured to initiate execution of the application on each of the compute nodes in the node pool. The one or more compute node are configured to generate, while executing the application, one or more logging or tracing messages according to the first message flow control policy.

BRIEF DESCRIPTION OF THE DRAWINGS

So that the manner in which the above recited features, advantages and objects of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENTS

Figure 1:
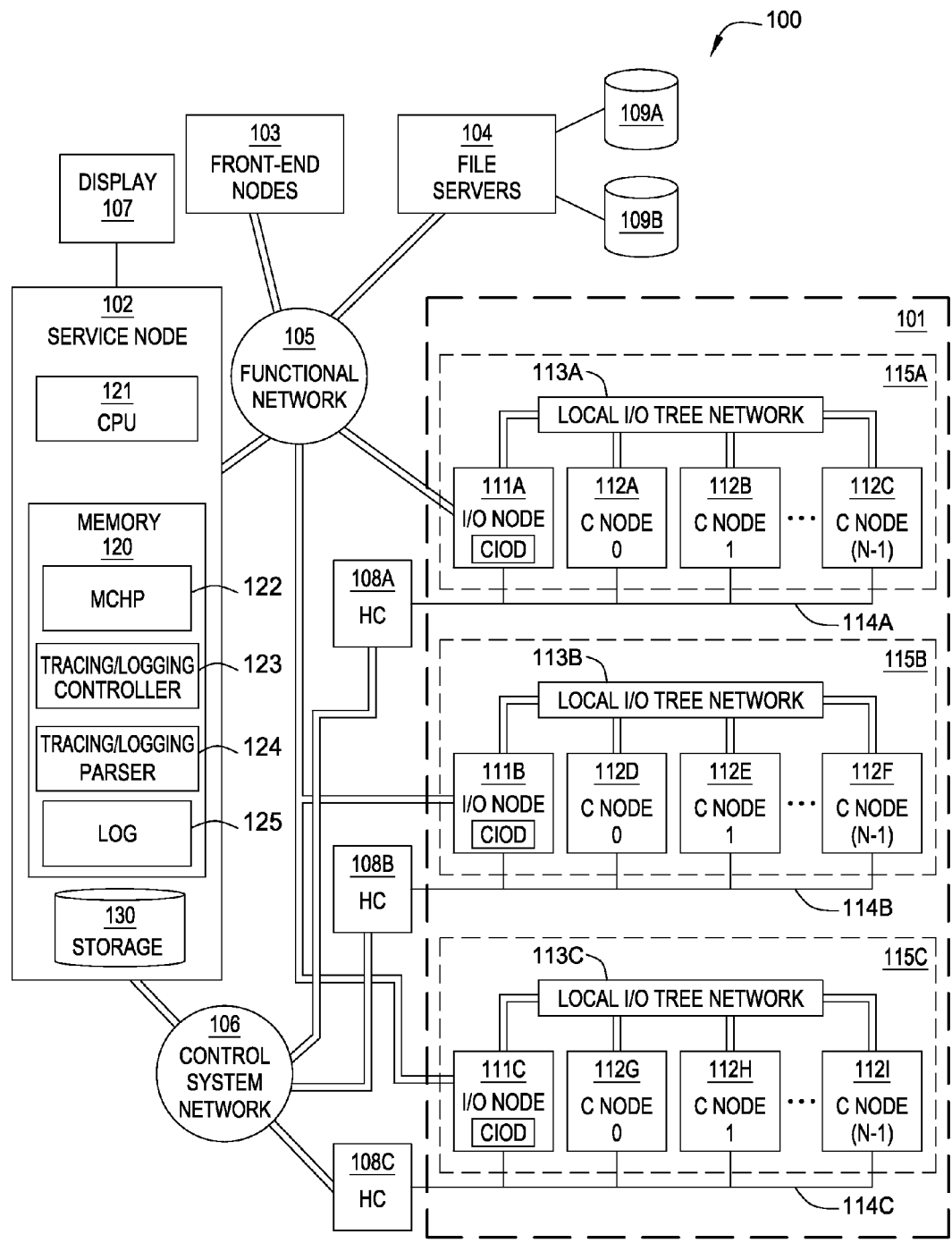
FIG. 1 is a block diagram illustrating components of a massively parallel computer system, according to one embodiment of the invention.

While providing tracing and logging functionalities in a massively parallel system is highly beneficial for the system, tracing/logging of each possible error/failure consumes significant resources. The more tracing/logging is performed the less resources, such as memory, remains available. Embodiments of the invention enable the system to decrease a message flow, which includes tracing/logging data, across the system without compromising monitoring consistency and operational capability of the system and its applications. This may be done by grouping compute nodes of the system into node pools and processing errors jointly for each node pool according to pre-defined error-control policies.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the invention, are embodiments of the invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the invention, are embodiments of the invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus, the invention should not be limited to use solely in any specific application identified and/or implied by such nomenclature.

Furthermore, while one skilled in the art understands that tracing is not exactly the same as logging, the principles of the invention may be similarly applied to both concepts. Accordingly, though in the present disclosure often only one term is referred, this use of the terminology should not be considered limiting the invention to one particular concept.

FIG. 1 is a block diagram illustrating components of a massively parallel computer system 100, according to one embodiment of the invention. Illustratively, the computer system 100 shows the high-level architecture of an IBM Blue Gene® computer system. However, other parallel computer systems could be used, and the description of a preferred embodiment herein is not intended to limit the invention.

As shown, the computer system 100 includes a compute core 101 having a plurality of compute nodes 112 arranged in a regular array or matrix. The compute nodes 112 perform the useful work performed by the computer system 100. The operation of the computer system 100, including the compute core 101, may be controlled by a service node 102. Various additional processors in front-end nodes 103 may perform auxiliary data processing functions, and file servers 104 provide an interface to data storage devices such as disk based storage 109A, 109B or other I/O operations. A functional network 105 provides the primary data communication path among the compute core 101 and other system components. For example, data stored in storage devices attached to the file servers 104 is loaded and stored to other system components through the functional network 105.

Also as shown, the compute core 101 includes I/O nodes 111A-C and compute nodes 112A-I. The compute nodes 112 provide the processing capacity of the parallel computer system 100, and are configured to execute applications written for parallel processing. The I/O nodes 111 handle I/O operations on behalf of the compute nodes 112. For example, the I/O node 111 may retrieve data from the file servers 104 requested by one of compute nodes 112. Each I/O node 111 may include a processor and interface hardware that handles I/O operations for a set of N compute nodes 112, the I/O node and its respective set of N compute nodes are referred to as a Pset. The compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core 101 to execute user applications, as well as data output produced by the compute core 101, is communicated over the functional network 105. The compute nodes within a Pset 115 communicate with the corresponding I/O node over a corresponding local I/O tree network 113A-C. Program launch, termination, and I/O requests/operations within each Pset 115 are accomplished using point-to-point messages between the compute nodes 112 and the corresponding I/O node 111. This functionality is provided by a daemon called Control and I/O daemon (CIOD) running on the I/O node 111. The I/O nodes, in turn, are connected to the functional network 105, over which they communicate with I/O devices, attached to file servers 104, or with other system components. Thus, the local I/O tree networks 113 may be viewed logically as extensions of the functional network 105, and like the functional network 105, are used for data I/O, although they are physically separated from the functional network 105.

The service node 102 may be configured to direct the operation of the compute nodes 112 in the compute core 101. In one embodiment, the service node 102 is a computer system that includes a processor (or processors) 121, internal memory 120, and local storage 130. An attached console 107 (i.e., a keyboard, mouse, and display) may be used by a system administrator or similar person to initialize computing jobs on the compute core 101. The service node 102 may also include an internal database which maintains state information for the compute nodes in the compute core 101, and an application which may be configured to, among other things, control the allocation of hardware in the compute core 101, direct the loading of data on the compute nodes 112, migrate process running on one of the compute nodes 112 to another one of the compute nodes 112, and perform diagnostic and maintenance functions.

Illustratively, memory 120 also includes a messaging-control policies holder (MCPH) 122, a tracing/logging controller 123, a tracing/logging parser 124, and a log 125. The tracing/logging controller 123 is configured to group the compute nodes 112 into node pools and to apply the messaging-control policies of MCHP 122, such as error-control policies (described below in greater detail) to the compute nodes 112. In one embodiment, the tracing/logging controller 123 is also configured to analyze messages generated by the compute nodes 112 (e.g., to determine how many messages are generated, what time, by which nodes, and so on) and, based on the results of such analysis, adjust/amend the messaging-control policies of MHPC 122. Such an arrangement allows for dynamic adjustment of the policies to current functioning of the computer system 100, and thus provides for better message flow control.

In one embodiment, the tracing/logging parser 124 may parse content of the messages, e.g., to identify duplicate messages and provide the parsing results to the tracing/logging controller 123, which in turn may amend the policies of MCHP 122 applied to the node pools. The log 125 is configured to store tracing messages and/or logging events, such as error messages, and may be used by both, the tracing/logging controller 123 and the tracing/logging parser 124. It should be noted that not every embodiment includes the tracing/logging parser 124. For example, the tracing/logging controller 123 may also be configured to perform the functions of the tracing/logging parser described above. In yet another, embodiment messages content simply is not parsed. Moreover, the tracing/logging controller 123 and parser 124 need not reside on the service node 102. Instead, controller 123 and parser 124 may reside on one or more of the compute nodes.

In one embodiment, the service node 102 communicates control and state information to the nodes of the compute core 101 over a control system network 106. As shown, the control network 106 is coupled to a set of hardware controllers 108A-C. Each hardware controller communicates with nodes of a respective Pset 115 over a corresponding local hardware control network 114A-C. The hardware controllers 108 and local hardware control networks 114 are logically an extension of the control system network 106, although physically separate. In one embodiment, the control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to the service node 102 in real-time. That is, while an application is running on the compute core 101, network performance and/or network state data may be gathered and transmitted to service node 102 without affecting the performance of that application. Of course, one of ordinary skill in the art will recognize that other hardware monitoring facilities may be used.

In addition to the service node 102, the front-end nodes 103 provide computer systems used to perform auxiliary functions which, for efficiency or otherwise, are best performed outside the compute core 101. Functions which involve substantial I/O operations are generally performed in the front-end nodes 103. For example, interactive data input, application code editing, or other user interface functions are generally handled by the front-end nodes 103, as is application code compilation or application debugging. The front-end nodes 103 are also connected to the functional network 105 and may communicate with the file servers 104.

As stated, in a massively parallel computer system 100, compute nodes 112 may be logically arranged in a three-dimensional torus, where each compute node 112 may be identified using an x, y and z coordinate.

Figure 2:
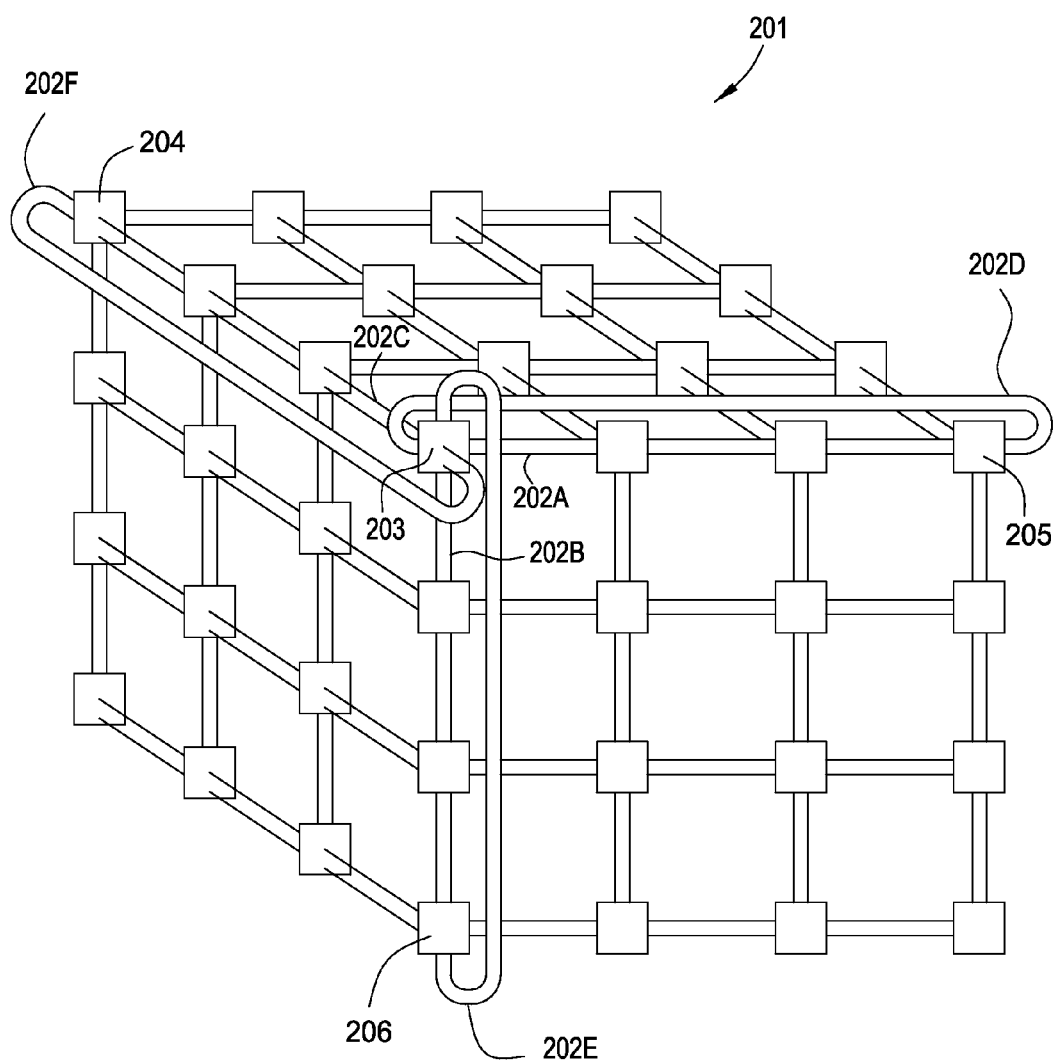
FIG. 2 is an illustration of a three-dimensional torus network of system, according to one embodiment of the invention.

FIG. 2 is a conceptual illustration of a three-dimensional torus network of a computer system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 112 along with and an additional 1024 I/O nodes 111. Illustratively, each compute node 112 in the torus 201 includes a set of six node-to-node communication links 202A-F which allows each compute nodes in the torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a compute node 203 to other end of the compute core 201 in each of the x, y and z dimensions. Thus, although the node 203 appears to be at a "corner" of the torus, node-to-node links 202A-F link the node 203 to the nodes 204, 205, and 206, in the x, y, and Z dimensions of the torus 201.

Figure 3:
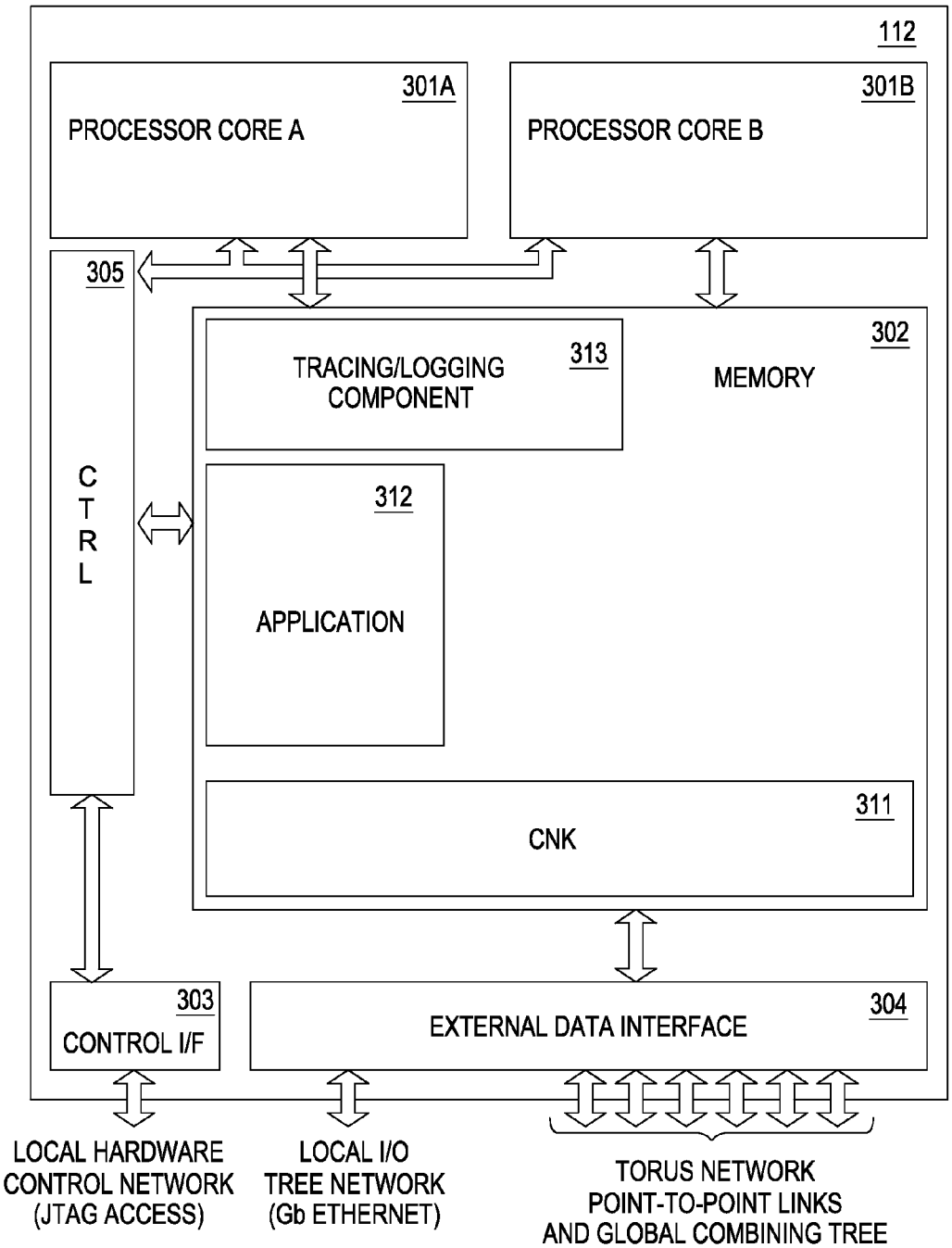
FIG. 3 illustrates components of a compute node of the system of FIG. 1, according to one embodiment of the invention.

FIG. 3 illustrates components of a compute node 112 of the computer system 100 of FIG. 1, according to one embodiment of the invention. As shown, the compute node 112 includes processor cores 301A and 301B, each having an instruction address register 306A and 306B. The compute node 112 also includes memory 302 used by both processor cores 301; an external control interface 303 which is coupled to a local hardware control network 114 (e.g., the control system network 106); an external data communications interface 304 which is coupled to the corresponding local I/O tree network 113 and the corresponding six node-to-node links 202 of the torus network 201; and includes monitoring and control logic 305 which receives and responds to control commands received through external control interface 303. The monitoring and control logic 305 may access the processor cores 301 and locations in the memory 302 on behalf of the service node 102 to read (or in some cases alter) the operational state of the compute node 112. In one embodiment, each compute node 112 may be physically implemented as a single integrated circuit.

As described, the functional network 105 may service many I/O nodes 111, and each I/O node 111 is shared by a group of compute nodes 112 (i.e., a Pset). Thus, it is apparent that the I/O resources of the parallel computer system 100 are relatively sparse when compared to computing resources. Although it is a general purpose computing machine, the parallel computer system 100 is designed for maximum efficiency in applications which are computationally intense.

As shown in FIG. 3, the memory 302 stores an operating system image 311. The operating system image 311 provides a copy of a simplified-function operating system running on the compute node 112, referred to as a compute node kernel (CNK). CNK 311 provides a minimal set of functions required to support operation of the compute node 112.

One functionality provided by the CNK 311 is to forwards system calls of the compute node 112 for service. A separate process running on the corresponding I/O node 111, namely CIOD, services system calls on behalf of CNK 311. In particular, I/O system requests initiated by a user application 312 running on the compute node 112 (e.g., open, close, read, write, etc.) are trapped by CNK 311 and shipped via point-to-point messages to CIOD of its corresponding I/O node 111. CIOD also supports a service connection providing a trace facility and status reporting for the compute nodes 112. The trace output allows seeing the flow of control through the running CIOD. The status reporting allows seeing current states of various objects maintained by CIOD and the compute nodes 112.

In one embodiment, a tracing/logging component 313 may reside in the memory 302. The tracing/logging controller 123 of the service node 102 directs the tracing/logging component 313 to implement the messaging-control policies of MCHP 122 (such as error-control polices) corresponding to the compute node 112. For example, in one embodiment, the tracing/logging component 313 may disable a certain error processing. For example, application 312 may be configured with multiple logging levels or tracing configurations, (e.g., error processing of errors having severity level ranging from 1-5, where 1 represents a minimal level of logging and 5 represents a maximum verbosity in logging; error processing of errors having severity level ranging from 1-5, where 1 represents least critical errors, such as correctable errors, and 5 represents most critical errors, such as fatal errors). In such a case, the tracing/logging controller 123 may set different logging levels for multiple nodes running a respective copy of application 312. This allows for at least some nodes to execute the application 312 with a great deal of logging activity, while other nodes perform only a minimal degree of logging. Given that each node may execute a copy of the same application, the logging on the node set to a maximal logging level may provide logging data representative of logging on all the applications. Similarly, the tracing/logging controller 123 may activate tracing features for only a few nodes running the same application and use the information from those nodes as being representative of overall application performance. An alternative scenario includes assigning the same level of tracing and/or logging to multiple compute nodes, but doing so for different components of an application 312. Doing so allows the cost of debugging/logging functions to be distributed across multiple compute nodes. In another embodiment, the tracing/logging component 313 may intercept messages of a certain type (e.g., info messages) from the compute node 112, so messages of this type are not transmitted across the computer system 100.

Figure 4:
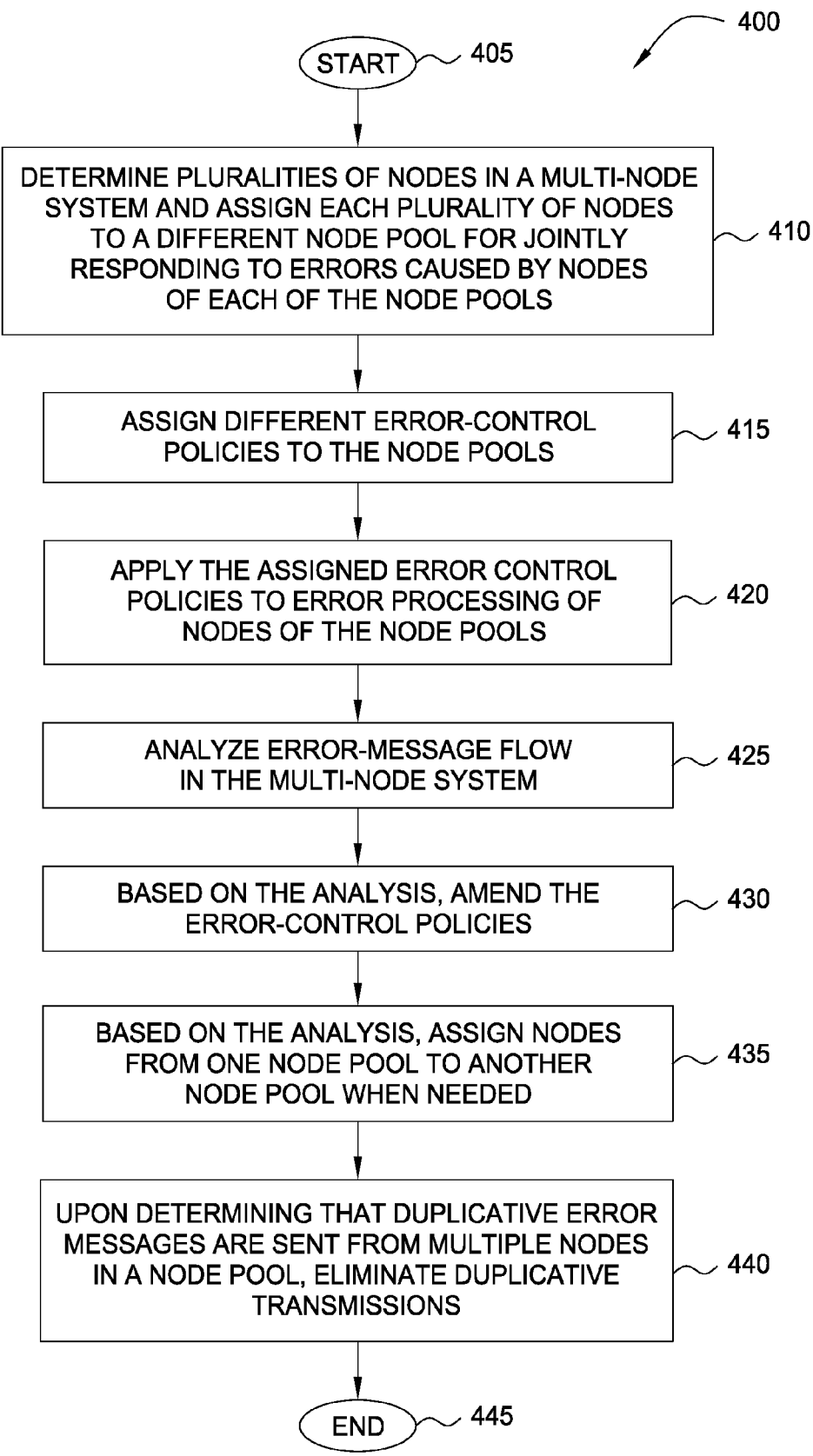
FIG. 4 is a flowchart illustrating a method for controlling a message flow in a multi-node system, according to one embodiment of the invention.
Figure 5A:
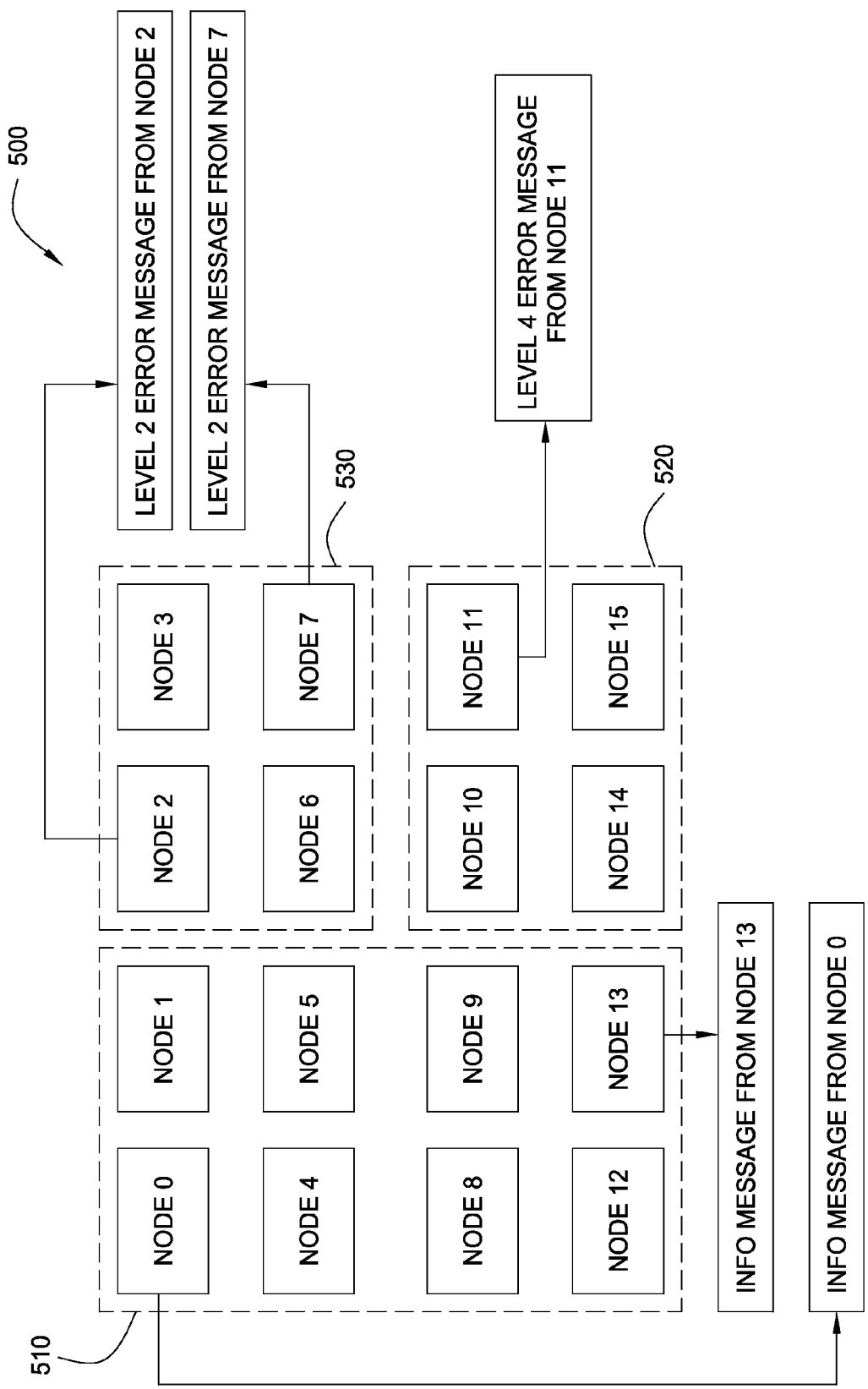
FIGS. 5A and 5B illustrate a selective grouping of compute nodes in a multi-node system, according to one embodiment of the invention.
Figure 5B:
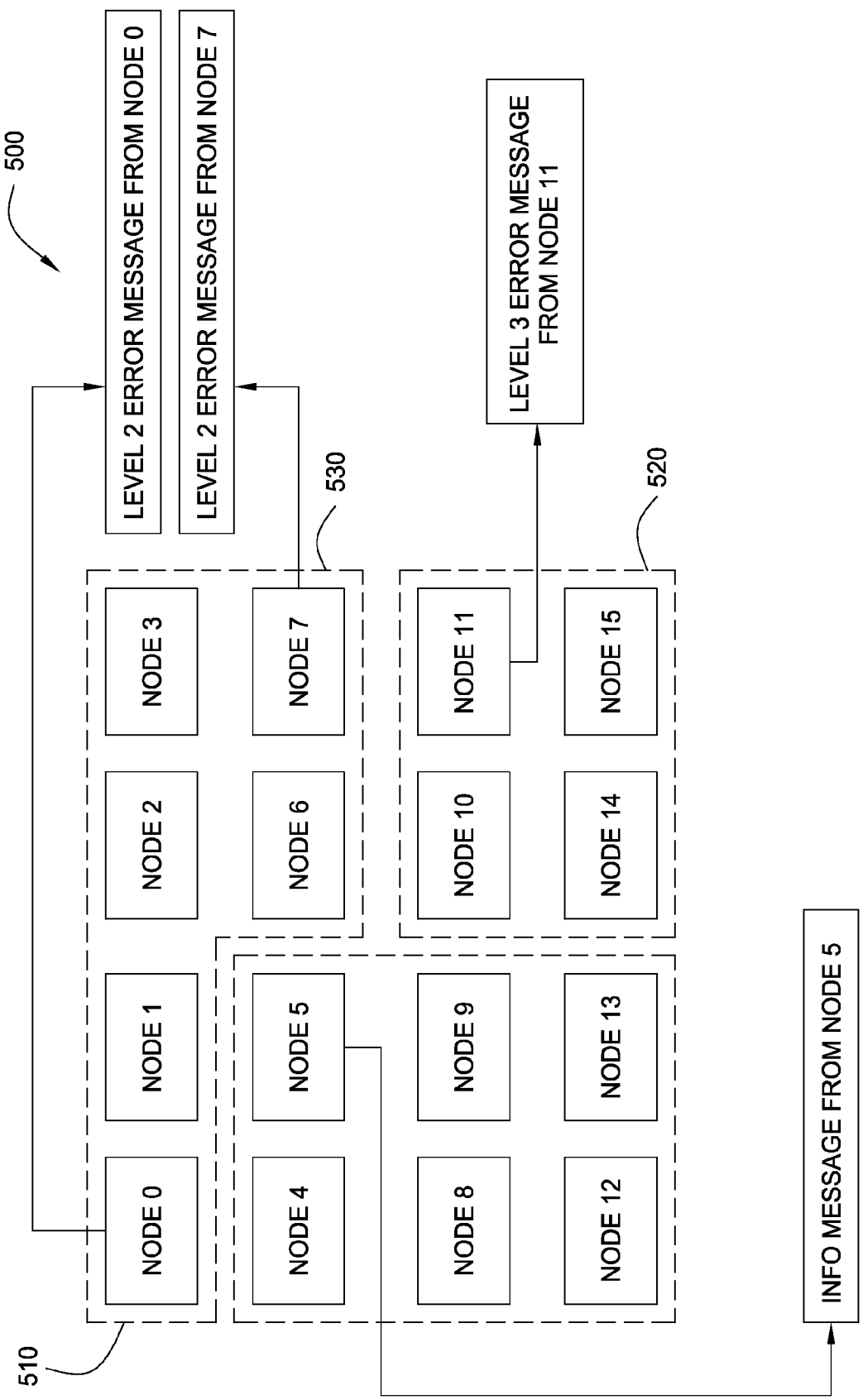

Additional examples of messaging-control policies are discussed in reference to FIGS. 4, 5A, and 5B. FIG. 4 illustrates a method 400 for controlling message flow across the computer system 100, according to one embodiment of the invention. As shown, the method 400 begins at step 405. At step 410, the compute nodes of the computer system 100 are grouped into node pools, where each node pool contains a plurality of compute nodes. Such grouping is performed in such a manner that errors logged/traced by the applications running on a node in a given node pool are analyzed together. This allows modifying error processing for the compute nodes within the node pool in such a way that necessary and/or representative error data continues to be generated and analyzed, while duplicate or unimportant error data may be omitted. Consequently, the resources of the computer system 100 are conserved and may be used by the system for other purposes.

Typically, the compute nodes assigned to one node pool execute the same user application. However, the compute nodes may run different user applications, not be connected to each other. Furthermore, in one embodiment, some of the compute nodes may be assigned to several node pools, while other compute nodes are not assigned to any of the node pools.

At steps 415 and 420, one or more error-control policies are assigned and applied respectively to the node pools. In general, an error-control policy defines tracing characteristics of the nodes within a node pool. For example, an error-control policy may define a type of error processing (e.g., INFO, ERROR, CONFIG, and so on), error severity level (e.g., 1-5), specific error (e.g., such as error specific to a particular user application running on the compute nodes 112 assigned to the node pool).

The error-control policy may further define how the defined type of error processing should be used in a particular node pool. For example, the error-control policy may specify that error processing should be disabled/turned on for errors of a certain type, certain error severity level, or specific error (e.g., disable error processing of errors having an error severity level of 2). The error-control policy may further specify whether error processing should be disabled only for one node, all nodes, or a certain number of nodes in the node pool (e.g., disable error processing of errors having severity level of 2 for all compute nodes in the node pool except one; disable error processing of the "Info" type errors for every compute node in the node pool, turn on error processing of errors of any kind for a certain compute node in the node pool; and so on).

In another embodiment, the error-control policy may specify that no error messages should be transmitted from nodes of the node pool, though the error messages continue to be generated. Because the messages are not transmitted, resources of the computer system 100 are conserved. Optionally, such messages may be combined and locally logged, so they may be accessed when and if needed.

Typically, the error-control policies applied to the node pools differ between the node pools as doing so allows error processing/logging to be distributed across compute nodes 112. However, this is not necessarily the case. For example, two node pools including compute nodes 112 each running a different user application may be assigned similar error-control policies (such as turning off all error processing for each compute node 112 except a subset of one or more nodes in the pool).

Further, in one embodiment, an error-control policy includes only one condition (such as turn off an error processing of a certain kind for certain nodes in a node pool), while multiple conditions (such as turning off two kinds of error processing) may be applied to the same set of the compute nodes by assigning that set of compute nodes to multiple pools. In such a case, each node pool may be assigned a different error-control for the set of compute nodes. Alternatively, one node pool may be used for each set of the compute nodes 112 where the corresponding error-control policy includes multiple conditions applicable to that set of the compute nodes.

Optionally, after the error-control policies have been applied to the node pools (step 415), the error-message flow of the computer system 100 may be analyzed (step 420) to determine whether any of the error-control policies need to be amended and/or any compute nodes should be assigned to new node pools. For example, if it is determined that none of the error-messages describing errors of a kind described by an error-control policy are generated from a node pool to which the error-control policy is assigned, such an error-control policy may be amended (step 435). One possible amendment of an error-control policy is changing an error condition defined by the error-control policy (e.g., changing the error severity level from 1 to 2; changing the error type from "Info" to "Config;" and so on). Another possible error-control policy amendment is changing the compute node(s) to which the policy is applied (e.g., turning error processing on one compute node and disabling the same kind of error processing on another compute node). It should be noted that when an error-control policy has been amended, tracing characteristics of the compute nodes assigned to a node pool having this error-control policy change to correspond to the amended error-control policy.

For similar reasons, it may be beneficial to switch compute nodes between the node pools. For example, if based on the analysis of the error-message flow it is determined that a compute node in one node pool generates error of the same kind as compute nodes in another node pool, such a compute node may be re-assigned to the node pool where the compute nodes generate similar errors. When a compute node is assigned to a new pool, its tracing characteristic change to correspond to the error-control policy assigned to that new pool.

It should be noted that the described error-control policy amendments or node switching are not necessarily based on the results of the error-message flow analysis. Changes in the computer system 100 (e.g., new user application installed on some of the compute nodes) may also be used to amend the error-control policies or assign nodes to new node pools, even when the error-message flow has not been analyzed.

In step 440, the content of an error-message (e.g., an error id and description) may optionally be used to determine whether duplicate error messages are being generated or transmitted across the computer system 100. When duplicate messages are identified, certain measures may be taken to avoid processing such messages unnecessarily. For example, in one embodiment the duplicate messages are not transmitted over the computer system 100, but instead collected and logged locally. Later, a condensed summary of the error messages may be generated. Such a summary may include the duplicate error-message content and, optionally, description of the compute nodes that have caused generation of the duplicate error-messages.

In another embodiment, discovery of the duplicate messages may cause error-control policies to be modified or a node being assigned to another node pool. For example, the compute nodes generating duplicate error-messages may be assigned to the same node pool. Then, one compute node in the node pool may be selected and an error-control policy may be created. This error-control policy would turn off error processing causing the duplicate messages to be generated for every compute node in the node pool except for the previously selected compute node. The method 400 ends at step 445.

It should be noted that it is not necessary to perform all of the above-described steps in the order named. Furthermore, not all of the described steps are necessary for the described method to operate. Which steps should be used, in what order the steps should be performed, and whether some steps should be repeated more often than other steps is determined, based on, for example, specific qualities of the computer system 100, available resources, user applications running on the compute nodes 112, and so on. It should further noted, that though the description above primarily focuses on error-messages, the invention is not limited to processing of error-messages. The principles described above may similarly be applied to other types of messages transmitted across the computer system 100. For example, logging messages indicating processing activity by an application running the compute nodes. In such a case, different nodes may be set to different logging levels, or different logging activity may be performed by different pools of nodes, effectively distributing the resource cost of logging across the node pools.

FIGS. 5A and 5B illustrate a selective grouping of compute nodes 112 in the parallel computer system 100, according to one embodiment of the invention. Specifically, FIGS. 5A and 5B illustrate 16 compute nodes of the computer system 100, namely compute nodes 0 through 15 which are assigned to three node pools; namely node pools 510, 520, and 530. A messaging-control policy applied to the node pool 510 specifies that only tracing messages having an "info" type should be generated (and/or reported) by the nodes of the pool 510. A messaging-control policy applied to the node pool 520 provides that only a certain kind of error messages may be generated by the compute nodes of the node pool 520; namely error messages having a hypothetical error severity level of "2." An error-control policy applied to the node pool 530 specifies that only one compute node in the node pool 530; namely, node 11, should perform generate and or report error messages (e.g., logging/tracing messages) while the error processing for other compute nodes in the node pool 530 is disabled.

As shown in FIGS. 5A and 5B, the node pool 520 includes nodes 10, 11, 14, and 15. However, the node pools 510 and 530 differ between FIGS. 5A and 5B. Specifically, nodes 0 and 1 are included in the node pool 510 in FIG. 5A and in the node pool 530 in FIG. 5B. As described above, in certain circumstances it is advantageous for a multi-node system, such as the computer system 100) to switch compute nodes among different node pools. Thus, in this example, FIGS. 5A and 5B show that nodes 0 and 1 have been re-assigned from node pool 510 to the node pool 530 in FIG. 5B. Note, however, as soon as the nodes 0 and 1 are switched to the node pool 530, the policies applied to these nodes switches accordingly, and thus, tracing characteristics of the compute nodes 0 and 1 change to correspond to the messaging-control policy of the node pool 530. Thus, in this example, while in FIG. 5A, any info messages generated by the compute node 0 are logged/traced and reported. In contrast, in FIG. 5B, node 0 only generates an error message having the severity error level of 2.

Advantageously, as described herein, embodiments of the invention enable controlling a message flow across multiple compute nodes of a highly-parallel system. For example, by grouping the compute nodes into node pools and allowing a certain kind of error of processing only for one node in a node pool while disabling such error processing for the other nodes in the node pool, message flow across the system may be significantly decreased without compromising monitoring consistency and operational capability of the system and its applications. Further, in one embodiment, upon determining that duplicate messages are generated, the duplicate messages are prevented from transmitting across the system and a condensed summary of the duplicate messages is provided instead. Doing so frees memory and processing resources of the system and reduces the amount of the system monitoring.

While the foregoing is directed to embodiments of the invention, other and further embodiments of the invention may be devised without departing from the basic scope thereof, and the scope thereof is determined by the claims that follow. Furthermore, while the invention has been described using a Blue Gene/L parallel computing system, the Blue Gene/L system is merely an example. This example should not be considered limiting the scope of the invention, for the principles of the invention described herein are similarly applicable and equally effective in any multi-node computing system or environment.

What is claimed is:

1. A computer-implemented method for controlling message flow in a parallel computing system having a plurality of compute nodes, the method comprising:
   assigning a first set of compute nodes to a first node pool;
   assigning a first message flow control policy to at least two compute nodes of the first node pool, wherein the first message flow control policy specifies at least one logging activity to be performed by an instance of an application running on each of the at least two compute nodes of the first node pool, and wherein subsequent modifications to the assigned first message flow control policy affect one or more of the at least one logging activities performed by each instance of the application running on the at least two compute nodes;
   initiating execution of the application on each of the compute nodes in the first node pool;
   while executing the application on the at least two compute nodes of the first node pool, generating a plurality of logging messages according to the first message flow control policy; and
   upon determining that two or more of the at least two compute nodes of the first node pool are generating duplicate error messages based on content of the plurality of logging messages:
      assigning a selected one of the two or more compute nodes to a second node pool; and
      assigning a second message flow control policy corresponding to the second node pool to the selected compute node, wherein the second message flow control policy is distinct from the first message flow control policy, and wherein logging activity performed by the instance of the application running on the selected compute node is controlled by the second message flow control policy rather than the first message flow control policy.

2. The method of claim 1, further comprising:
   transmitting, by the first compute node, the one or more generated messages to a service node; and
   storing, by the service node, each generated message.

3. The method of claim 1, wherein the message flow control policy specifies logging activity to be performed by a plurality of compute nodes assigned to the first node pool, and wherein a logging activity level is assigned to each instance of the application.

4. The method of claim 3, wherein the logging activity level specifies a level of verbosity for generating log messages while executing the instance of the application on each respective compute node.

5. The method of claim 3, wherein the message flow control policy specifies logging activity to be performed by a plurality of compute nodes assigned to the first node pool, and wherein multiple sets of compute nodes of the first node pool are each assigned a respective logging activity level.

6. The method of claim 1, wherein the message flow control policy specifies logging activity to be performed by the instance of the application running on the compute nodes assigned to the first node pool, and wherein a first logging activity level is assigned to a first instance of the application and a second logging activity level is assigned to at least a second instance of the application, wherein the first and second logging activity levels are different from one another.

7. The method of claim 1, wherein the message flow control policy specifies logging activity to be performed by a plurality of compute nodes assigned to the first node pool and specifies that the first instance of the application executing on the first compute node should generate log messages relative to a first type of event of the application and a second instance of the application should generate log messages relative to a second type of event.

8. The method of claim 1, wherein the message flow control policy specifies to generate a logging message for a first occurrence of a specified event and to not generate further logging messages for additional occurrences of the specified event.

9. The method of claim 1, further comprising:
assigning a second set of compute nodes to the second node pool, wherein the second message flow control policy is assigned to each compute node of the second node pool, and wherein the second message flow control policy specifies at least one of logging and/or tracing activity to be performed by an instance of the application running on at least one compute node assigned to the second node pool.

10. The method of claim 1, wherein each compute node in the at least two compute nodes includes a respective compute node kernel (CNK) and a respective tracing/logging application, and wherein the plurality of logging messages are generated by the tracing/logging application, rather than by the CNK, according to a portion of the first message flow control policy specific to the respective compute node.

11. The method of claim 10, wherein assigning the second message flow control policy corresponding to the second node pool to the selected compute node is performed without modifying the CNK of the selected compute node.

12. The method of claim 1, wherein the first message flow control policy specifies that the at least one logging activity is disabled for errors of a first error type, for one or more compute nodes of the first node pool, wherein the at least one logging activity for the first error type remains enabled for the at least two compute nodes of the first node pool.

13. The method of claim 1, wherein the content of the plurality of logging messages comprises a respective error identifier and a description for each of the plurality of logging messages, and wherein the steps of assigning the selected compute node to the second node pool and assigning the second message flow control policy corresponding to the second node pool to the selected compute node are performed without requiring user interaction.

14. The method of claim 1, further comprising:
analyzing the plurality of logging messages to determine that a first compute node of the at least two compute nodes is generating logging messages that are sufficiently similar to a set of logging messages generated by compute nodes assigned to a third node pool;
assigning, without requiring user interaction, the first compute node to the third node pool, rather than the first node pool; and
assigning a third message flow control policy corresponding to the third node pool to the first compute node, wherein the third message flow control policy is distinct from both the first message flow control policy and the second message flow control policy, and wherein logging activity performed by the instance of the application running on the first compute node is controlled by the third message flow control policy rather than either the first message flow control policy or the second message flow control policy.

15. A non-transitory computer-readable medium containing a program which, when executed by a processor, performs an operation for controlling message flow in a parallel computing system having a plurality of compute nodes, the operation comprising:
assigning a first set of compute nodes to a first node pool;
assigning a first message flow control policy to at least two compute nodes of the first node pool, wherein the first message flow control policy specifies at least one logging activity to be performed by an instance of an application running on each of the at least two compute nodes of the first node pool, and wherein subsequent modifications to the assigned first message flow control policy affect one or more of the at least one logging activities performed by each instance of the application running on the at least two compute nodes;
initiating execution of the application on each of the compute nodes in the first node pool;
while executing the application on the at least two compute nodes of the first node pool, generating a plurality of logging messages according to the first message flow control policy; and
upon determining that two or more of the at least two compute nodes of the first node pool are generating duplicate error messages based on content of the plurality of logging messages:
assigning a selected one of the two or more compute nodes to a second node pool; and
assigning a second message flow control policy corresponding to the second node pool to the selected compute node, wherein the second message flow control policy is distinct from the first message flow control policy, and wherein logging activity performed by the instance of the application running on the selected compute node is controlled by the second message flow control policy rather than the first message flow control policy.

16. The non-transitory computer-readable medium of claim 15, wherein the operations further comprises:
transmitting, by the first compute node, the one or more generated messages to a service node; and
storing, by the service node, each generated message.

17. The non-transitory computer-readable medium of claim 15, wherein the message flow control policy specifies logging activity to be performed by a plurality of compute nodes assigned to the first node pool, and wherein a logging activity level is assigned to each instance of the application.

18. The non-transitory computer-readable medium of claim 17, wherein the logging activity level specifies a level of verbosity for generating log messages while executing the instance of the application on each respective compute node.

19. The non-transitory computer-readable medium of claim 17, wherein the message flow control policy specifies logging activity to be performed by a plurality of compute nodes assigned to the first node pool, and wherein multiple sets of compute nodes of the first node pool are each assigned a respective logging activity level.

20. The non-transitory computer-readable medium of claim 15, wherein the message flow control policy specifies logging activity to be performed by the instance of the application running on the compute nodes assigned to the first node pool, and wherein a first logging activity level is assigned to a first instance of the application and a second logging activity level is assigned to at least a second instance of the application, wherein the first and second logging activity levels are different from one another.

21. The non-transitory computer-readable medium of claim 15, wherein the message flow control policy specifies logging activity to be performed by a plurality of compute nodes assigned to the first node pool and specifies that the first instance of the application executing on the first compute node should generate log messages relative to a first type of event of the application and a second instance of the application should generate log messages relative to a second type of event.

22. The non-transitory computer-readable medium of claim 15, wherein the operation further comprises:
assigning a second set of compute nodes to the second node pool, wherein the second message flow control policy is assigned to each compute node of the second node pool, and wherein the second message flow control policy specifies at least one of logging and/or tracing activity to be performed by an instance of the application running on at least one compute node assigned to the second node pool.

23. A parallel computing system, comprising:
a plurality of compute nodes, each having at least a processor and a memory, wherein the plurality of compute nodes is configured to execute a parallel computing task; and
a service node having at least a processor and a memory and a tracing-logging control program for controlling message flow in the parallel computing system, wherein the tracing-logging control program is configured to:
   assign a first set of compute nodes to a first node pool;
   assign a first message flow control policy to at least two compute nodes of the first node pool, wherein the first message flow control policy specifies at least one logging activity to be performed by an instance of an application running on each of the at least two compute nodes of the first node pool, and wherein subsequent modifications to the assigned first message flow control policy affect one or more of the at least one logging activities performed by each instance of the application running on the at least two compute nodes;
   initiate execution of the application on each of the compute nodes in the first node pool;
   while executing the application on the at least two compute nodes of the first node pool, generate a plurality of logging messages according to the first message flow control policy; and
   upon determining that two or more of the at least two compute nodes of the first node pool are generating duplicate error messages based on content of the plurality of logging messages:
      assign a selected one of the two or more compute nodes to a second node pool; and
      assign a second message flow control policy corresponding to the second node pool to the selected compute node, wherein the second message flow control policy is distinct from the first message flow control policy, and wherein logging activity performed by the instance of the application running on the selected compute node is controlled by the second message flow control policy rather than the first message flow control policy.

24. The parallel computing system of claim 23, wherein the message flow control policy specifies logging activity to be performed by a plurality of compute nodes assigned to the first node pool, and wherein multiple sets of compute nodes of the first node pool are each assigned a respective logging activity level.

25. The parallel computing system of claim 23, wherein the tracing-logging control program is further configured to:
   assign a second set of compute nodes to the second node pool, wherein the second message flow control policy is assigned to each compute node of the second node pool, and wherein the second message flow control policy specifies at least one of logging and/or tracing activity to be performed by an instance of the application running on at least one compute node assigned to the second node pool.

* * * * *